United States Patent

Koike et al.

[11] Patent Number: 5,173,865
[45] Date of Patent: Dec. 22, 1992

[54] METHOD AND APPARATUS FOR DETECTING MOTION OF MOVING PICTURE

[75] Inventors: Atsushi Koike; Masahide Kaneko, both of Tokyo; Yoshinori Hatori, Kawasaki, all of Japan

[73] Assignee: Kokusai Denshin Denwa Kabushiki Kaisha, Tokyo, Japan

[21] Appl. No.: 489,004

[22] Filed: Mar. 6, 1990

[30] Foreign Application Priority Data

Mar. 14, 1989 [JP] Japan .................................. 1-59729

[51] Int. Cl.$^5$ ............................................. G01B 11/00
[52] U.S. Cl. .................................... 364/516; 364/560; 358/107
[58] Field of Search ........................ 364/516, 560, 563; 358/105, 107; 356/385; 340/675

[56] References Cited

U.S. PATENT DOCUMENTS

| | | | |
|---|---|---|---|
| 4,825,393 | 4/1989 | Nishiya | 364/516 |
| 4,839,824 | 6/1989 | Ando | 364/516 |
| 4,855,932 | 8/1989 | Cangiani et al. | 364/516 |
| 4,959,800 | 9/1990 | Woolley | 364/516 |
| 4,984,179 | 1/1991 | Waldern | 364/516 |

Primary Examiner—Thomas G. Black
Assistant Examiner—Michael Zanelli
Attorney, Agent, or Firm—Emmanuel J. Lobato; Robert E. Burns

[57] ABSTRACT

A system for detecting three-dimensional motion of a three-dimensional object by obtaining, for each block, a velocity vector from two temporally successive images of a moving picture including the three-dimensional object. A three-dimensional model is prepared in correspondence to the solid configuration of the three-dimensional object, an area is obtained in the previous frame picture where the three-dimensional object and the three-dimensional model overlap, the area is divided into a plurality of blocks, a velocity vector between the current input image and the previous frame image is obtained for each block, depth information in the block is obtained from the three-dimensional model, and three-dimensional motion parameters of the three-dimensional object, that is, its rotational movement and translational movement components, are obtained from the velocity vectors and depth information thus obtained in the plurality of blocks, whereby the three-dimensional motion of the three-dimensional object is detected.

7 Claims, 8 Drawing Sheets

METHOD AND APPARATUS FOR DETECTING MOTION OF MOVING PICTURE

BACKGROUND OF THE INVENTION

The present invention relates to the encoding of moving pictures which are successively received from a television camera or the like and the recognition and interpretation of such moving pictures and, more particularly, to a method and apparatus for detecting three-dimensional motions and variations in the shape of a three-dimensional object in moving pictures.

To analyze three-dimensional motions of an object in a moving picture, that is, to detect its three-dimensional motion parameters, is an important technique in the fields of a three-dimensional motion compensated prediction, robot vision, etc. for the detection of a motion of a human head at the transmitting side in intelligent image coding of a moving picture of a face, video telephone, and so forth.

Heretofore, there has been known a method which utilizes an apparent velocity vector between frames for obtaining three-dimensional motion parameters of an object from temporally succeeding frames ("On the computation of motion from sequences of images-A review," Proc. IEEE, Vol. 76, No. 8, pp 917-935, August 1988).

However, the prior art system has a defect in that the estimation of three-dimensional motion and the detection of configurational changes cannot accurately be achieved.

SUMMARY OF THE INVENTION

An object of the present invention is to provide a method and an apparatus for detecting motions of a moving picture which permit accurate estimation of three-dimensional motion of an object and detection of variations in its shape.

According to an aspect of the present invention, in a system for detecting three-dimensional motion of a three-dimensional object by obtaining, for each block, a velocity vector from two temporally successive images of a moving picture including the three-dimensional object, a three-dimensional model is prepared in correspondence to the solid configuration of the three-dimensional object, an area is obtained in the previous frame picture where the three-dimensional object and the three-dimensional model overlap, the area is divided into a plurality of blocks, a velocity vector between the current input image and the previous frame image is obtained for each block, depth information in the block is obtained from the three-dimensional model, and three-dimensional motion parameters of the three-dimensional object, that is, its rotational movement and translational movement components, are obtained from the velocity vectors and depth information thus obtained in the plurality of blocks, whereby the three-dimensional motion of the three-dimensional object is detected.

According to another aspect of the present invention, the input image and, if necessary, the previous frame image are used to obtain the general configuration, position and direction of the three-dimensional object in the input image, and the results are utilized for the detection of the afore-mentioned three-dimensional motion parameters.

According to another aspect of the present invention, when the configuration of a part of an element of the three-dimensional object changes, the three-dimensional motion parameters detected as mentioned above are used as predicted values of the general movement of the three-dimensional object, characteristic points forming the configuration of the element are detected in the vicinity of a position provided by the predicted results to detect configurational changes of the element, and the configuration of the three-dimensional model corresponding to the element portion of the three-dimensional object is modified on the basis of the detected results.

According to still another aspect of the present invention, when the configuration of the three-dimensional model corresponding to the three-dimensional object is not accurate, the afore-mentioned three-dimensional motion parameters and luminance and/or chrominance information in the previous frame image are used to synthesize an image of the object moved in correspondence to the three-dimensional motion parameters, the synthesized image and the input image are compared with each other to obtain an error therebetween, information is issued for modifying the configuration of the three-dimensional model to reduce the error, the three-dimensional model is modified on the basis of the modifying information, the modified three-dimensional model and the luminance and/or chrominance information in the previous frame image are used to synthesize an image again, the synthesized image and the input image are compared with each other to obtain an error, the modification of the model and the synthesis of the image are repeated until the error becomes smaller than a predetermined value, thereby modifying the configuration of the three-dimensional model.

BRIEF DESCRIPTION OF THE DRAWINGS

The present invention will be described in detail below in comparison with prior art with reference to accompanying drawings, in which.

DETAILED DESCRIPTION

To make differences between prior art and the present invention clear, prior art will first be described.

Figure 8:
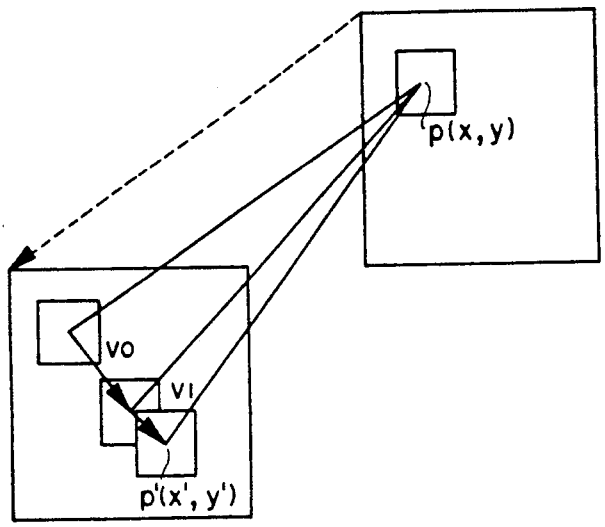
FIG. 8 is a diagram of a frame showing the basic principle of detection by an iterative slope method as an example of a conventional velocity vector detecting method.
Figure 9:
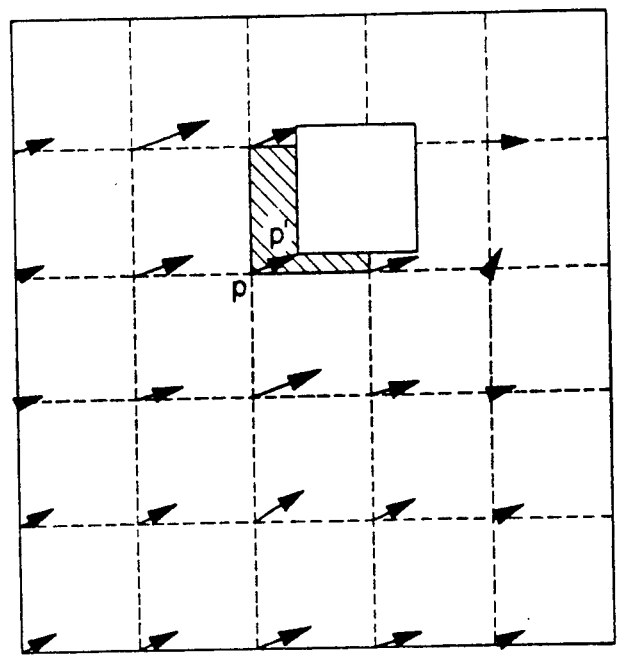
FIG. 9 is a velocity vector diagram for each block by the prior art.

According to the method of the above-mentioned prior art, velocity vectors are obtained for each unit between an input image (the current frame) and a preceding frame image (an image of the immediately preceding frame). A block matching or iterative gradient method is employed for obtaining the velocity vector. FIG. 8 shows the principle of the velocity vector detection by the conventional iterative gradient method. FIG. 9 shows, by way of example, velocity vectors by arrows between images for each block. For instance, the hatched block is shown to have moved from a point p(x, y) to a point p'(x', y'). Now, assume that the object is a rigid body and is projected in parallel. If a change (motion) between images is very small, the point p(x, y, z) on the object shifts to the point p'(x', y', z') after one frame period. The points p and p' are correlated with other by Eq. (1).

$$\begin{pmatrix} x' \\ y' \\ z' \end{pmatrix} = \begin{pmatrix} 1 & -Rz & Ry \\ Rz & 1 & -Rx \\ -Ry & Rx & 1 \end{pmatrix} \begin{pmatrix} x \\ y \\ z \end{pmatrix} + \begin{pmatrix} Tx \\ Ty \\ Tz \end{pmatrix} \quad (1)$$

By substituting in Eq. (1) the coordinates of a plurality of points on the object in the current and previous frames and solving Eq. (1) for Rx, Ry, Rz, Tx, Ty and Tz, a three-dimensional motion of the object is estimated. More specifically, rotational motion parameters (Rx, Ry, Rz) and translational motion parameters (Tx, Ty, Tz) and the depth coordinate z at each point on the object in Eq. (1) are estimated using the method of least squares or the like.

Figure 10:
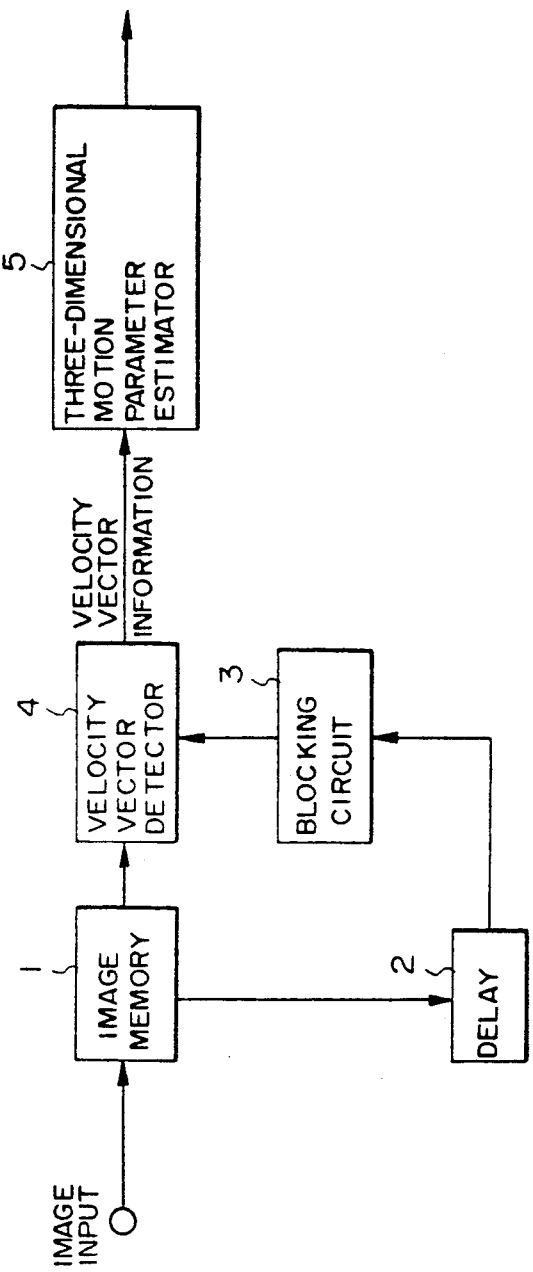
FIG. 10 is a block diagram of a conventional moving picture motion detecting apparatus.

FIG. 10 illustrates in block form a conventional moving picture motion detecting apparatus for detecting a three-dimensional motion of an object by the use of the velocity vector between frames. In FIG. 10 reference numeral 1 indicates an image memory, 2 a delay which provides a delay of at least one frame period, 3 a blocking circuit, 4 a velocity vector detector in two successive images, and 5 a three-dimensional motion parameter estimator which computes three-dimensional parameters based on the velocity vectors.

Next, the operation of each of these units will be described in brief. Digital image inputs from a television camera or the like are stored in the image memory 1. An image of one frame-preceding period (the immediately preceding frame) is read out of the delay 2 and is divided by the blocking circuit 3 on a block-wise basis. The velocity vector detector 4 detects a velocity vector between the preceding frame image read out of the blocking circuit 3 for each block and the current input image read out of the image memory 1. In the three-dimensional motion parameter estimator 5 the velocity vector detected in the velocity vector detector 4 is used to set up an equation of three-dimensional motion concerning the object and nonlinear simultaneous equations for parameters Rx, Ry, Rz, Tx, Ty, Tz and z are solved, thereby obtaining three-dimensional motion parameters concerning the object and the depth coordinate of the object corresponding to each block.

The conventional three-dimensional motion estimating method estimates three-dimensional motion parameters of an object through utilization of only information about an apparent velocity vector between two successive images. It is therefore necessary to obtain the depth coordinate of the object simultaneously with the estimation of the three-dimensional motion parameters. To meet with this requirement, the three-dimensional motion parameter estimator is needed to solve nonlinear simultaneous equations including nonlinear terms (Ry·z and Rx·z) which are the products of Rx and Ry representing rotational movement of the three-dimensional object and z representing its depth coordinate. These equations are very difficult to solve. Further, the necessity of obtaining the depth coordinate in the three-dimensional object poses a problem that a large storage size is required. Moreover, this system is based on the assumption that the object is a rigid body, so that when the three-dimensional motion as the rigid body (the head) is accompanied by variations in the shape of an eye or mouth, such variations cannot faithfully be detected.

Figure 2:
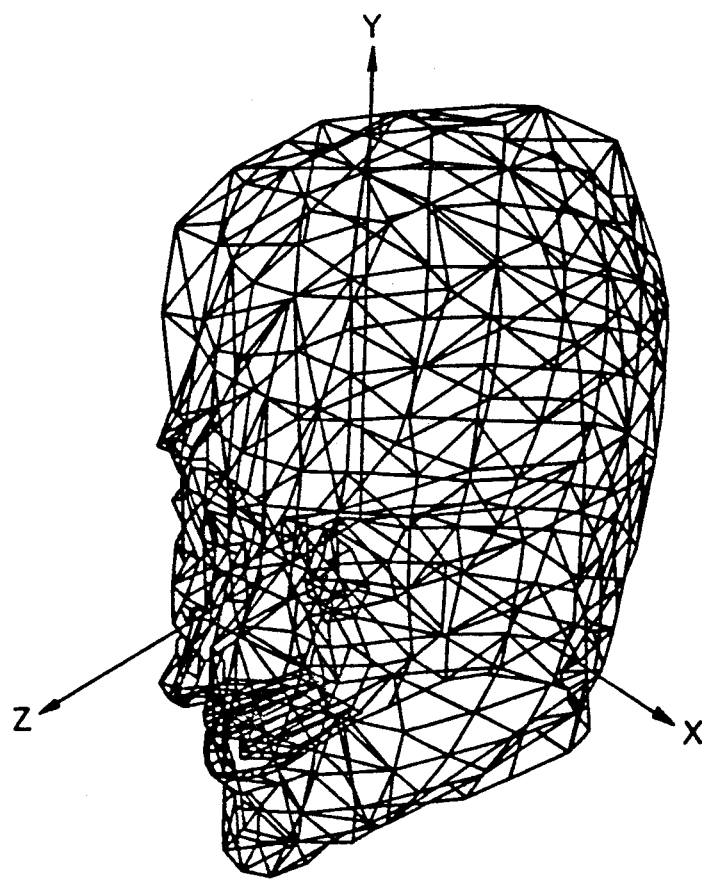
FIG. 2 is a diagram showing a three-dimensional model of a face for use in the present invention.

The following description will be given in respect of the case where the three-dimensional model for representing the three-dimensional configuration of an object is the head of a person formed by combinations of a large number of triangles as shown in FIG. 2.

Embodiment 1

Figure 1:
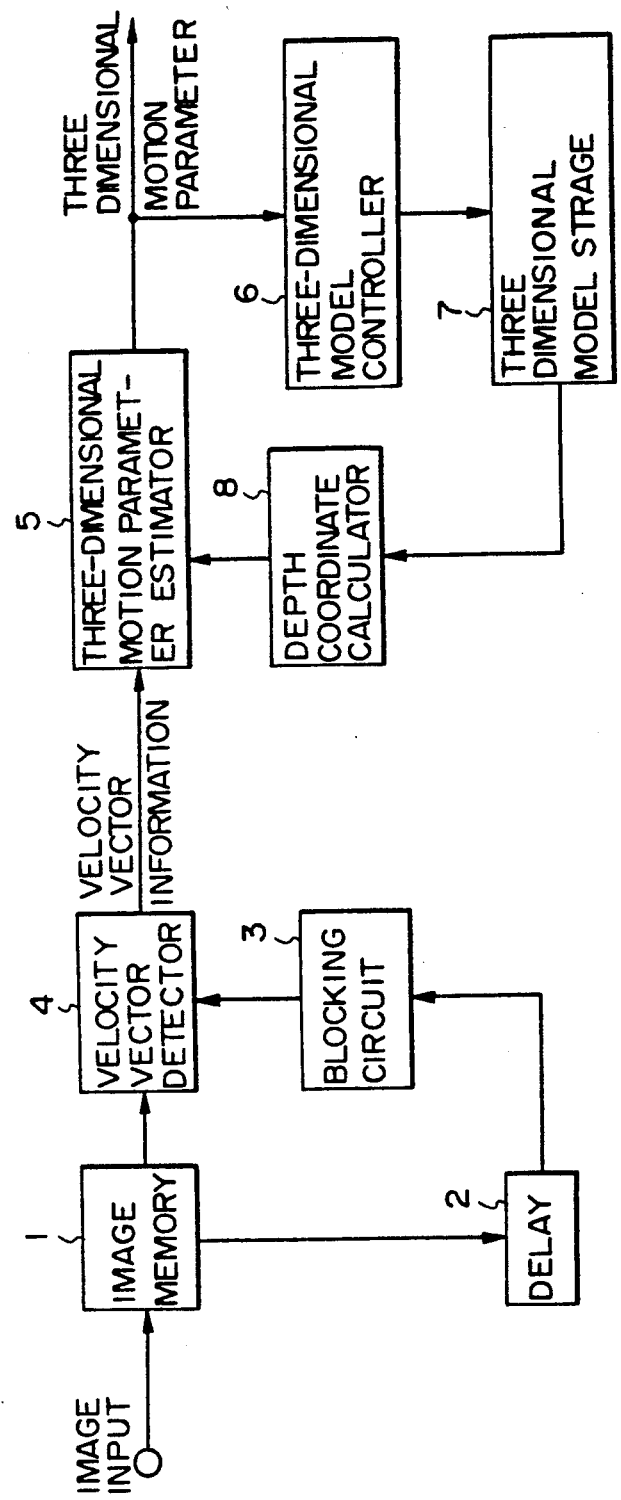
FIG. 1 is a block diagram of a first embodiment of an apparatus for detecting a motion of a moving picture of the present invention.

FIG. 1 is a block diagram explanatory of a first embodiment of an apparatus for detecting a motion of a moving picture of the present invention. In FIG. 1 reference numeral 1 indicates an image memory for storing an input image (picture), 2 a delay for providing a delay of at least one frame period, 3 a blocking circuit for dividing an image (picture) into a plurality of blocks, 4 a velocity vector detector, 5 a three-dimensional motion parameter estimator, 6 a three-dimensional model controller for controlling the configuration or the like of the three-dimensional model shown in FIG. 2, 7 a three-dimensional model storage for storing the controlled three-dimensional model, and 8 a depth coordinate calculator. The image memory 1 through the three-dimensional motion parameter estimator 5 are identical in those of the prior art shown in FIG. 10.

Figure 3:
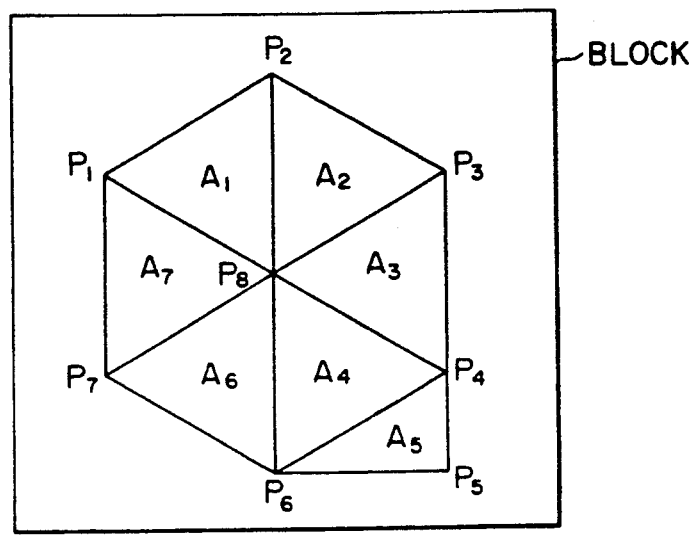
FIG. 3 is a diagram showing a triangle of the three-dimensional model in a block which is used in a depth coordinate calculating section according to the present invention.
Figure 4:
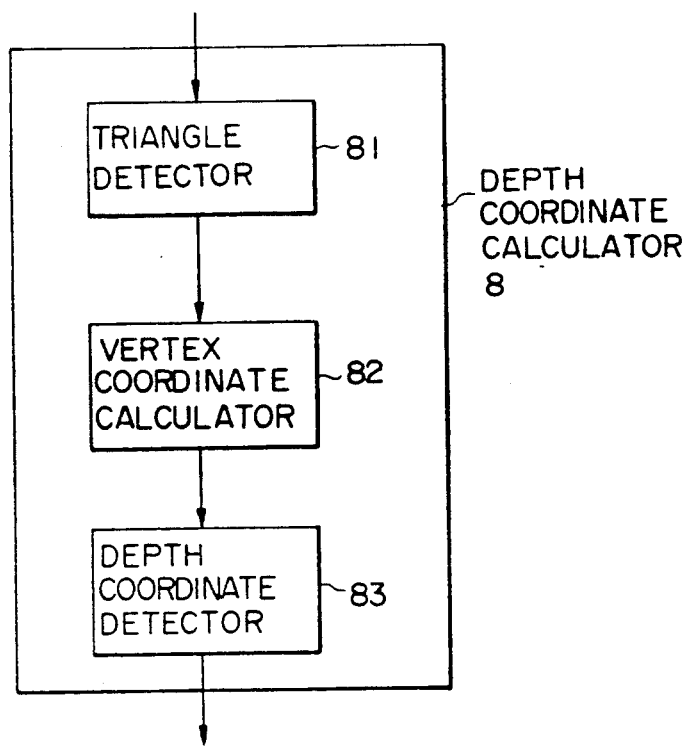
FIG. 4 is a block diagram of the depth coordinate calculator for use in the present invention.

Next, the operation of each section will be described. The blocking circuit 3 blocks an image of the previous frame input from the delay 2 and inputs it into the velocity vector detector 4. The velocity vector detector 4 obtains, for each block, a velocity vector between the input image read out of the image memory 1 and the previous frame image. In the three-dimensional motion parameter estimator 5 an equation of motion concerning the three-dimensional object is set up on the basis of Eq. (1) through the use of the velocity vector obtained by the velocity vector detector 4 for each block and the depth coordinate correponding to the block applied from the depth coordinate calculator 8. Unlike in the conventional system, this equation becomes linear simultaneous equations which do not include the non-linear terms (Rx,z and Ry,z) but use three-dimensional motion parameters (Rx, Ry, Rz as rotational motion parameters and Tx, Ty, Tz as parallel motion parameters) as variables. On this account, the three-dimensional motion parameters can be obtained more easily than in the prior art. In the three-dimensional model controller 6 the configuration, the position and the direction of the three-dimensional model of FIG. 2 corresponding to the three-dimensional object in the preceding frame image are adjusted into agreement with the configuration, the position and the direction of the input image by controlling the three-dimensional motion parameters. The resulting three-dimensional model is stored in the three-dimensional model storage 7. In the depth coordinate calculator 8 the depth coordinates at vertexes of a plurality of triangles constituting the three-dimensional model, which overlap the block provided from the velocity vector detector 4, are used to obtain the depth coordinates of the corresponding blocks. FIGS. 3 and 4 show an example of a method for obtaining the depth coordinate of the corresponding block according to the present invention.

FIG. 3 shows an example in which there are eight vertexes $P_1$ through $P_8$ of triangles of the three-dimensional model in the block divided by the blocking section 3.

At first, triangles ($A_1$ through $A_7$) are detected in a triangle detector 81 in the depth coordinate calculator 8 shown in FIG. 4. In a vertex coordinate calculator 82 the coordinates of vertexes $P_1$, $P_2$ and $P_3$ of the triangle $A_1$ are extracted. Of the extracted coordinates, a mean value of only the depth coordinates (the coordinates on the Z axis, for instance) is obtained in a depth coordinate detector 83. Such means values are also obtained for the other triangles ($A_2$ through $A_7$), and the overall mean value is used as the depth coordinate of the block.

While in the above the vertexes of each of the triangles ($A_1$ through $A_7$) are obtained, it is also possible to simply use the mean value of the vertexes of the triangles $A_1$ to $A_7$. In a case where a triangle has two vertexes inside the block and the remaining one outside it, the latter may also be included in the computation; that is, various methods can be employed for obtaining the mean value of the vertexes. In this embodiment a triangle of the three-dimensional model overlapping the block on the screen is obtained and the mean value of the depth coordinates at the vertexes of the triangle is used as the depth coordinate of the block.

EMBODIMENT 2

Figure 5:
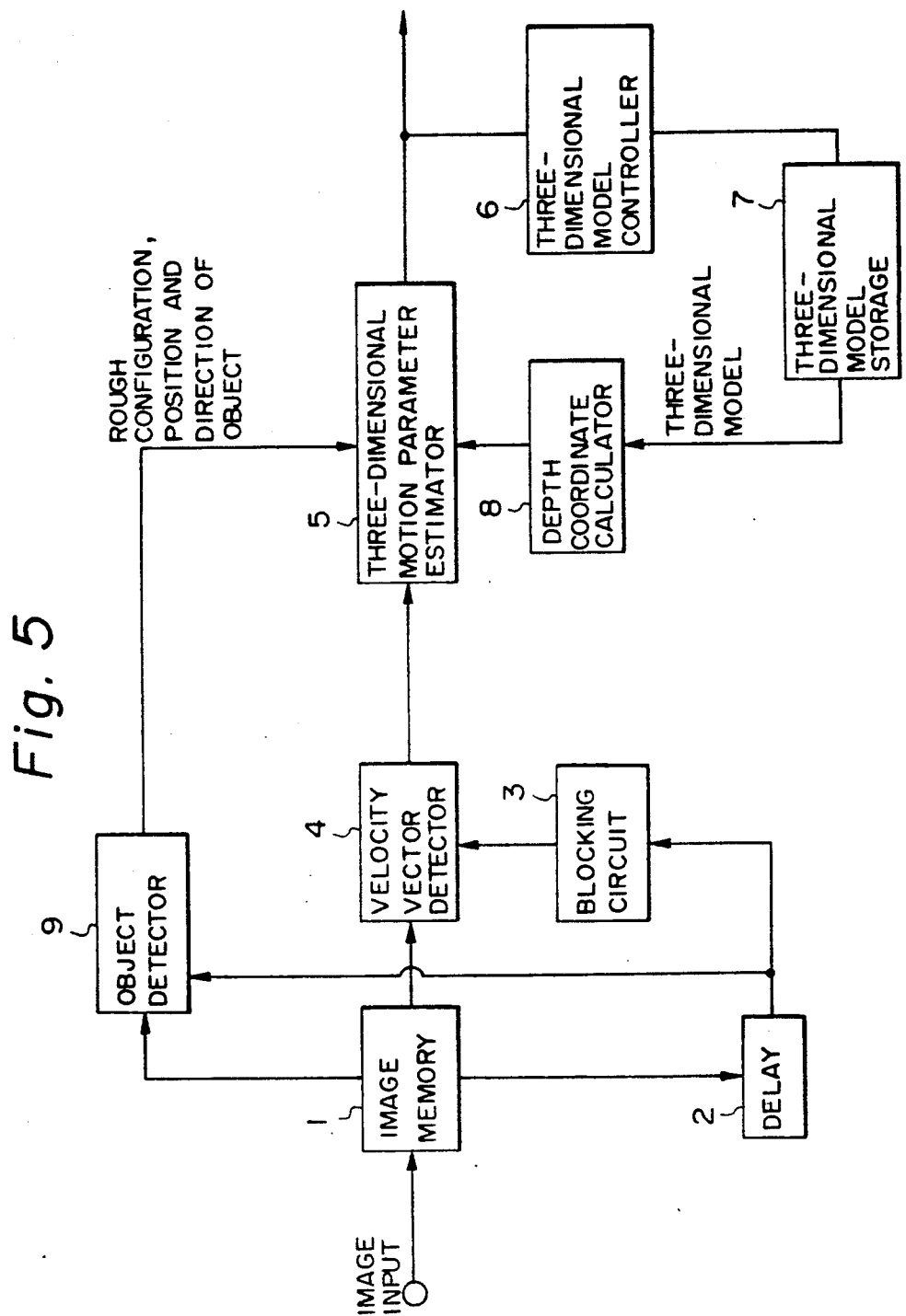
FIG. 5 is a block diagram of a second embodiment of an apparatus for detecting a motion of a moving picture of the present invention.

FIG. 5 is a block diagram explanatory of a second embodiment of an apparatus for detecting a motion of a moving picture of the present invention. This embodiment is adapted to effectively deal with an abrupt change in the motion of the object between frames. In FIG. 5 reference numeral 9 indicates an object detector. In the object detector 9 the input image (picture) read out of the image memory 1 and the image (picture) of the preceding frame read out of the delay 2 are used to roughly detect the configuration, the position and the direction of the object, an offset is determined in correspondence to the detected results, and then accurate motion parameters are estimated using the method described previously in connection with Example 1. The object can also be detected by, for example, a method which subtracts the image of the preceding frame from the input image to determine an area in which the object shifted in the time interval therebetween and roughly obtains the position of the object on the basis of the determined result, or a method which roughly obtains the configuration, the position and the direction of the object by encoding the input image into a binary form or differentiating the input image.

EMBODIMENT 3

Figure 6:
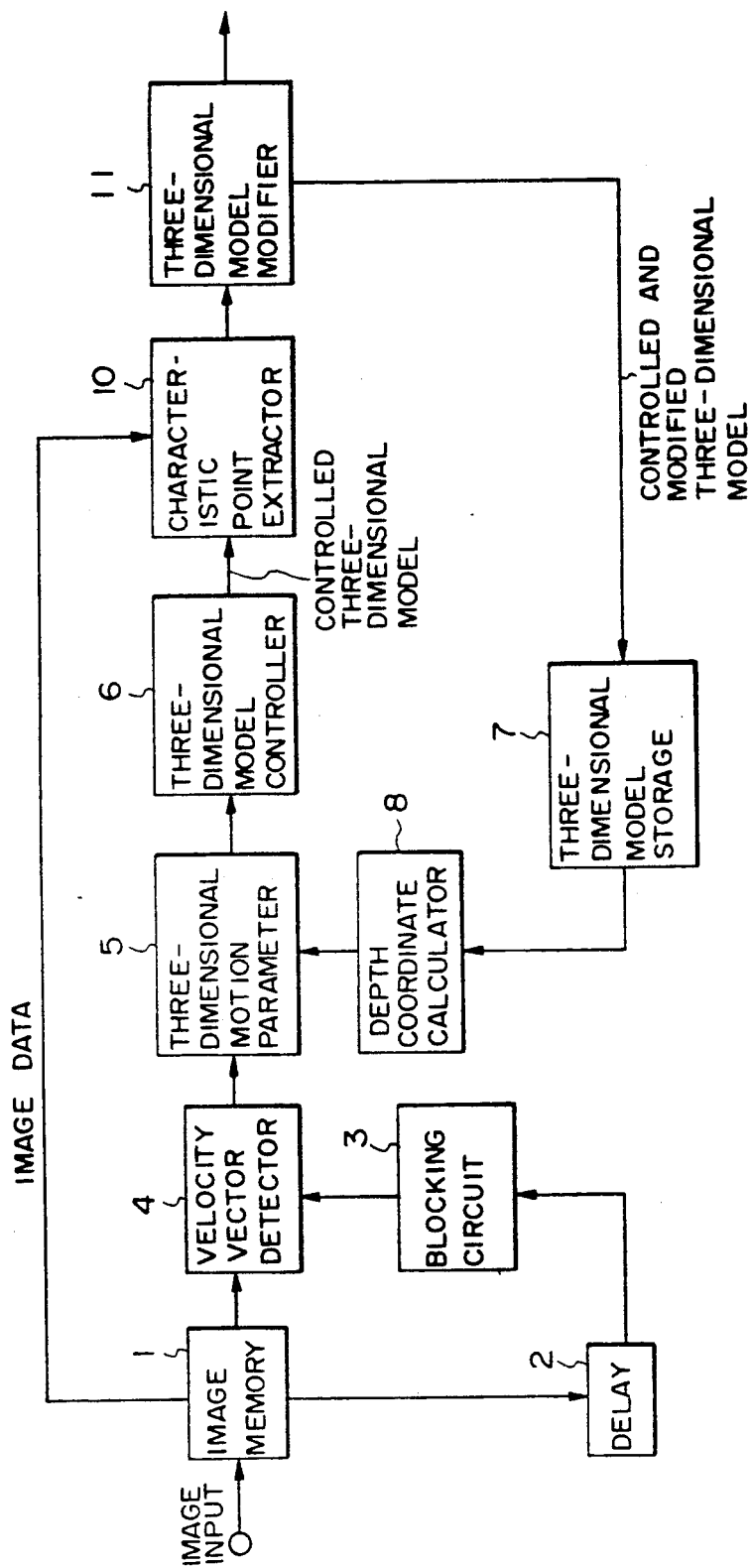
FIG. 6 is a block diagram of a third embodiment of an apparatus for detecting a motion of a moving picture of the present invention.

FIG. 6 is a block diagram illustrating a third embodiment of an apparatus for detecting a motion of a moving picture of the present invention. This embodiment is a modified form of Embodiment 1 which is adapted to permit the estimation of three-dimensional movement of the object and the detection of its configuration change even if a part of the element of the object changes its shape. In FIG. 6 reference numeral 10 indicates a characteristic point extractor for extracting the position of a characteristic point of the element and 11 a three-dimensional model modifier. This embodiment is identical in construction with Embodiment 1 except the above. The characteristic point extractor 10 predicts first the range of existence of characteristic points forming the element of the object through utilization of the controlled three-dimensional model obtained in the three-dimensional model controller 6 on the basis of the results obtained in the three-dimensional motion parameter estimator 5. In this instance, for example, a rectangular area which encompasses characteristic points in the controlled three-dimensional model is used as the prediction range. Next, the predicted range is searched to extract the characteristic points. This can be achieved by binary processing of the rectangular area with a certain value, for instance. The characteristic points can also be obtained by applying an edge detecting method such as differentiation processing. In a moving picture of a face, opening and closing of eyes and the mouth are detected.

EMBODIMENT 4

Figure 7:
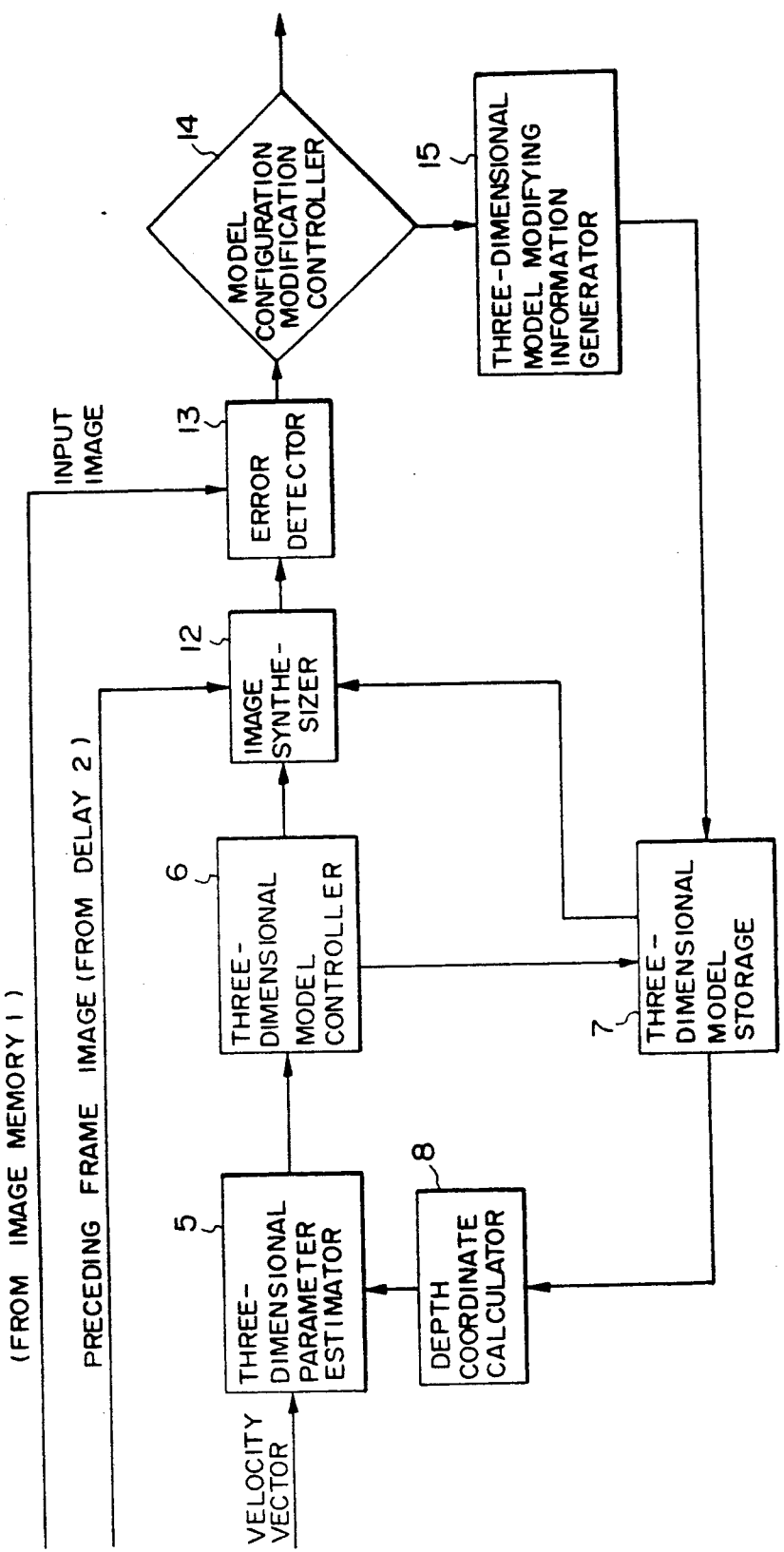
FIG. 7 is a block diagram of a fourth embodiment of an apparatus for detecting a motion of a moving picture of the present invention.

FIG. 7 illustrates in block form a fourth embodiment of an apparatus for detecting a moving picture of the present invention. This embodiment is a modified form of Embodiment 1 which is added with a means by which it is possible to estimate three-dimensional movement of the object and detect changes in its configuration while modifying the three-dimensional model in the case where the configuration and, in particular, the depth coordinates of the three-dimensional model are not accurately obtained.

In FIG. 7 reference numeral 12 indicates an image synthesizer, 13 an error detector, 14 a model configuration modification controller and 15 a three-dimensional model modifying information generator. This embodiment is identical in construction with Embodiment 1 except the above. In the image synthesizer 12 the controlled three-dimensional model from the three-dimensional model controller 6 and the luminance and/or chrominance information in the preceding frame image are used to synthesize an image. The error detector 13 detects an error between the synthesized image and the input image. This can be achieved, for example, by a square error calculation between the two images. In the three-dimensional model modification controller 14 the error detected by the error detector 13 is used to determine whether or not the controlled three-dimensional model is matched with the configuration of the object in the input image, and based on the result of determination, it is controlled whether or not to modify the configuration of the three-dimensional model. The determination of modifying the controlled three-dimensional model is dependent on whether or not the error exceeds a predetermined value. The three-dimensional model modifying information generator 15 uses the error detected by the error detector 13 to issue three-dimensional model modifying information, which is, for example, information about modification of the depth coordinate at a vertex forming the configuration of the three-dimensional model. The three-dimensional model modifying information is provided to the three-dimensional model storage 7, wherein the configuration of the corresponding part of the three-dimensional model is modified. More specifically, the modification is performed by increasing or decreasing the depth coordinates of vertexes forming the configuration of the three-dimensional model. The thus modified model is stored in the three-dimensional model storage 7 and, at the same time, it is input into the image synthesizer 12, wherein the sequences of processing mentioned above are repeated. This processing is repeated until the error becomes smaller than a predetermined value in the model configuration modification controller 14.

In the present invention it is also possible to combine Embodiments 2 and 3 or 2 and 4.

As described above, according to the present invention, the use of a three-dimensional model of an object permits an accurate estimation of three-dimensional motion of a three-dimensional object with more ease and a smaller storage size than in the case of the conventional system.

Moreover, in the case where the object abruptly moves between frames, its three-dimensional motion can be detected roughly recognizing the configuration, the position and the direction of the object through application of, for instance, movement area determination or binary processing and edge detection to the input image.

Furthermore, three-dimensional motion parameters obtained are used for predicting the general motion of the object, by which even if the shape of a part of an element of the object changes gradually, the general movement and such a gradual change in the shape of a part can be detected.

Moreover, when the three-dimensional model for the object is not so accurate, an image synthesis is performed on the basis of the results of estimation in the three-dimensional motion parameter estimator, an error is detected between the synthesized image and the input image, and the three-dimensional model is modified to reduce the error, by which it is possible to gradually approximate the three-dimensional model to the configuration of the three-dimensional object while detecting its three-dimensional motion.

Thus, the present invention is applicable to the estimation of three-dimensional motion of an object and the detection of a change in its shape in various fields which require the estimation of three-dimensional motion of an object, for example, robot vision, understanding and recognition of a moving picture, and an intelligent moving picture coding system in which three-dimensional models of an object are prepared at both transmitting and receiving sides and a moving picture is encoded only by the transmission of information about modification of the model. Hence, the present invention is of great utility when employed in practice.

What we claim is:

1. An apparatus for detecting motion of a moving picture, comprising:
    an image signal input terminal for inputting an image signal obtained by imaging a three-dimensionally moving object and digitizing an output obtained by said imaging;
    an image memory for storing said imput image signal;
    a storage for storing a three-dimensional model of said three-dimensional object corresponding to a result of an estimation of a three-dimensional motion of said object in a preceding frame of the imput image signal;
    a delay section for delaying, for one frame period of said input image signal, an image including said three-dimensional object, stored in said image memory;
    a blocking circuit for dividing said image from said delay section into a plurality of blocks;
    a velocity vector detector for obtaining a velocity vector of said three-dimensional object between each of said blocks and said input image signal read out of said image memory;
    a depth coordinate calculator for obtaining depth coordinates for each of said blocks through the use of said three-dimensional model corresponding to the result of estimation of movement of said object in said preceding frame;
    a three-dimensional motion parameter estimator for obtaining three-dimensional motion parameters of said three-dimensional object between adjacent frames based on said velocity vector and said depth coordinates of each of said blocks; and
    a three-dimensional model controller for adjusting, by the output of said three-dimensional motion parameter estimator, said three-dimensional model to provide an adjusted three-dimensional model so as to assume the same position and direction as those of said three-dimensional object.

2. An apparatus for detecting motion of a moving picture according to claim 1, further comprising:
    an object detector for obtaining general configuration, position and direction of said three-dimensional object in said input image signal from said input image signal read out of said image memory and, an image of said preceding frame read out of said delay section.

3. An apparatus for detecting motion of moving picture according to claim 1, further comprising:
    a characteristic point extractor whereby when a configurational change occurs in a part of the element of said object, positions of characteristic points in said three-dimensional object are extracted from said adjusted three-dimensional model; and
    a three-dimensional model modifier whereby said three-dimensional model corresponding to said element is modified based on a result of said extraction.

4. An apparatus for detecting motion of a moving picture according to claim 1, further comprising:
    an image synthesizer whereby an image corresponding to said three-dimensional motion parameters is synthesized by using luminance and chrominance information in an image of said preceding frame and said three-dimensional object;
    an error detector for detecting an error between said synthesized image provided from said image synthesizer section and said input image signal;
    a modifying information generator for generating information relating to modification of a configuration of said three-dimensional model so that said error is reduced;
    a three-dimensional model storage for storing a three-dimensional model modified in accordance with said modifying information; and
    a configuration modification controller for repeating operations of said modification of said three-dimensional model until said error becomes smaller than a predetermined value.

5. In a method for detecting three-dimensional motion of a moving picture including a three-dimensional object moving three-dimensionally, the method comprising the steps of:

obtaining a velocity vector from the moving picture for each of a plurality of blocks of two temporally successive frames;

obtaining three-dimensional parameters, for simultaneous equations concerning the three-dimensional motion of said three-dimensional object, from depth information in each block of a former one of the two temporally successive frames and the velocity vector obtained;

detecting respective estimated values of rotation movement and parallel movement as output parameters of the three-dimensional object by solving the simultaneous equations;

adjusting the three-dimensional model by the three-dimensional motion parameters to substantially match it with direction, position and configuration of the input moving picture of an instant frame to produce, from the adjusted three-dimensional model, said depth information in each block of the former one of the two temporally successive frames corresponding to depth information in each block of the instant frame;

synthesizing an image from the adjusted three-dimensional model adjusted by the three-dimensional motion parameters by the use of luminance and chrominance information in the former one of the two temporally successive frames;

detecting an error between said synthesized image and the moving picture of the instant frame; and modifying said three-dimensional model to compensate for said error.

6. In a method for detecting three-dimensional motion of a moving picture including a three-dimensional object moving three-dimensional, the method comprising the steps of:

obtaining a velocity vector from the moving picture for each of a plurality of blocks of two temporally successive frames;

detecting general movement information of position, configuration and direction of said three-dimensional object in an instant frame by comparing between an instant one and a preceding one of said two temporally successive frames;

obtaining, in view of said general movement information, three-dimensional motion parameters, for simultaneous equations concerning the three-dimensional motion of said three-dimensional object, from depth information in each block of a former one of the two temporally successive frames and the velocity vector obtained;

detecting respective estimated values of rotation movement and parallel movement as output parameters of the three-dimensional motion of said three-dimensional object by solving the simultaneous equations;

adjusting the three-dimensional model by the three-dimensional motion parameters to substantially match it with direction, position and configuration of the input moving picture of an instant frame to produce, from the adjusted three-dimensional model, said depth information in each block of the former one of the two temporally successive frames corresponding to depth information in each block of the instant frame;

synthesizing an image from the adjusted three-dimensional model adjusted by the three-dimensional motion parameters by the use of luminance and chrominance information in the former one of the two temporally successive frames;

detecting an error between said synthesized image and the moving picture of the instant frame; and modifying said three-dimensional model to compensate for said error.

7. A method for detecting three-dimensional motion of a moving picture according to claims 5 or 6, further comprising:

predicting an existing area of any characteristic point of a configuration of said three-dimensional object from said three-dimensional model obtained by said step of adjusting respective estimated values of rotation movement and parallel movement;

obtaining position deviation of said characteristic point as a change of configuration in the instant frame from said existing area predicted; and shifting a position of the characteristic point of said three-dimensional model to said characteristic point of the instant frame in accordance with said position deviation of said characteristic point.

* * * * *